Feb. 23, 1960                D. T. AYERS, JR                2,925,890
                        BOOSTER BRAKE MECHANISM
Filed March 9, 1956                                    3 Sheets-Sheet 1
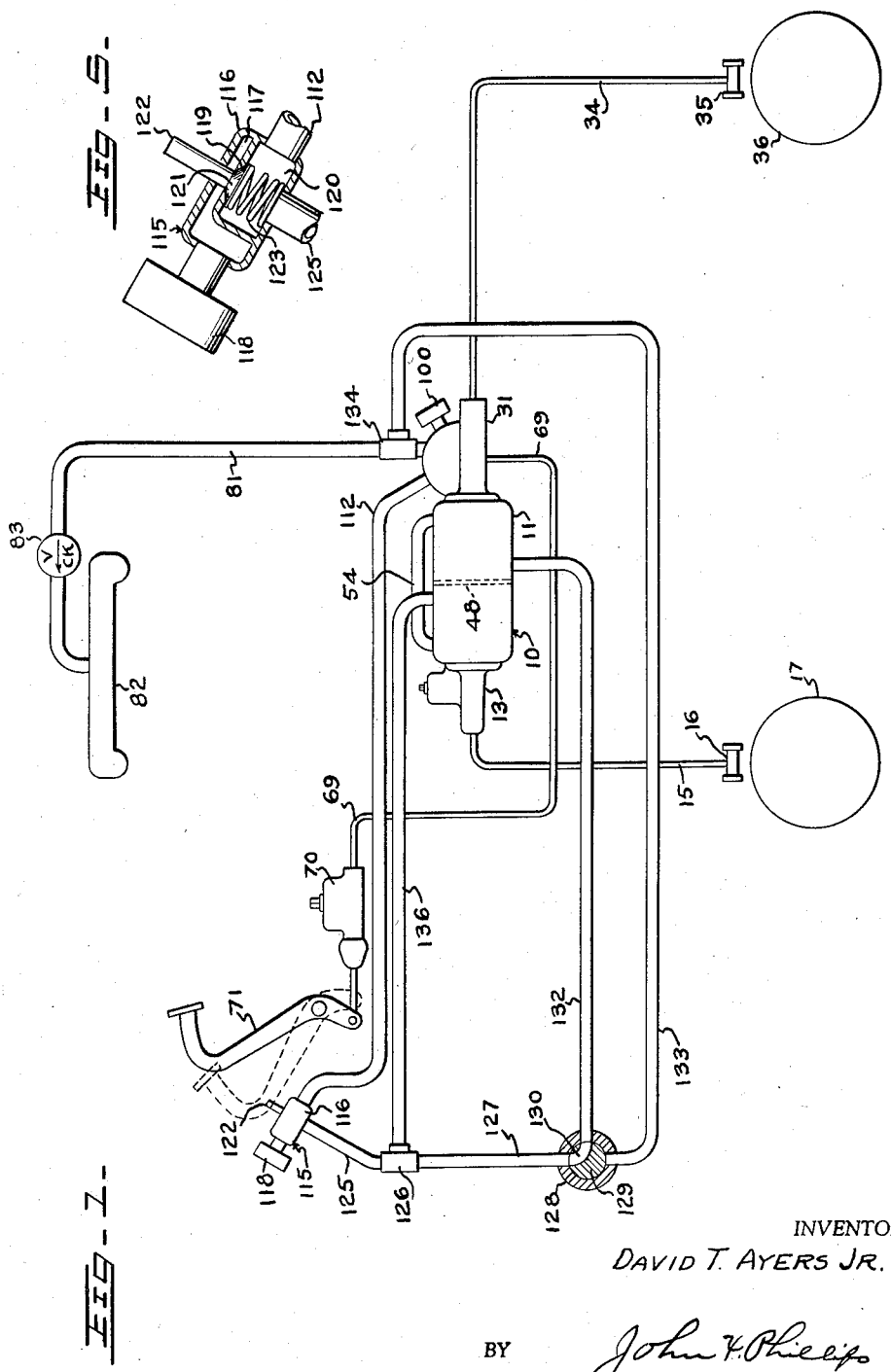
INVENTOR
DAVID T. AYERS JR.
BY John F. Phillips
ATTORNEY

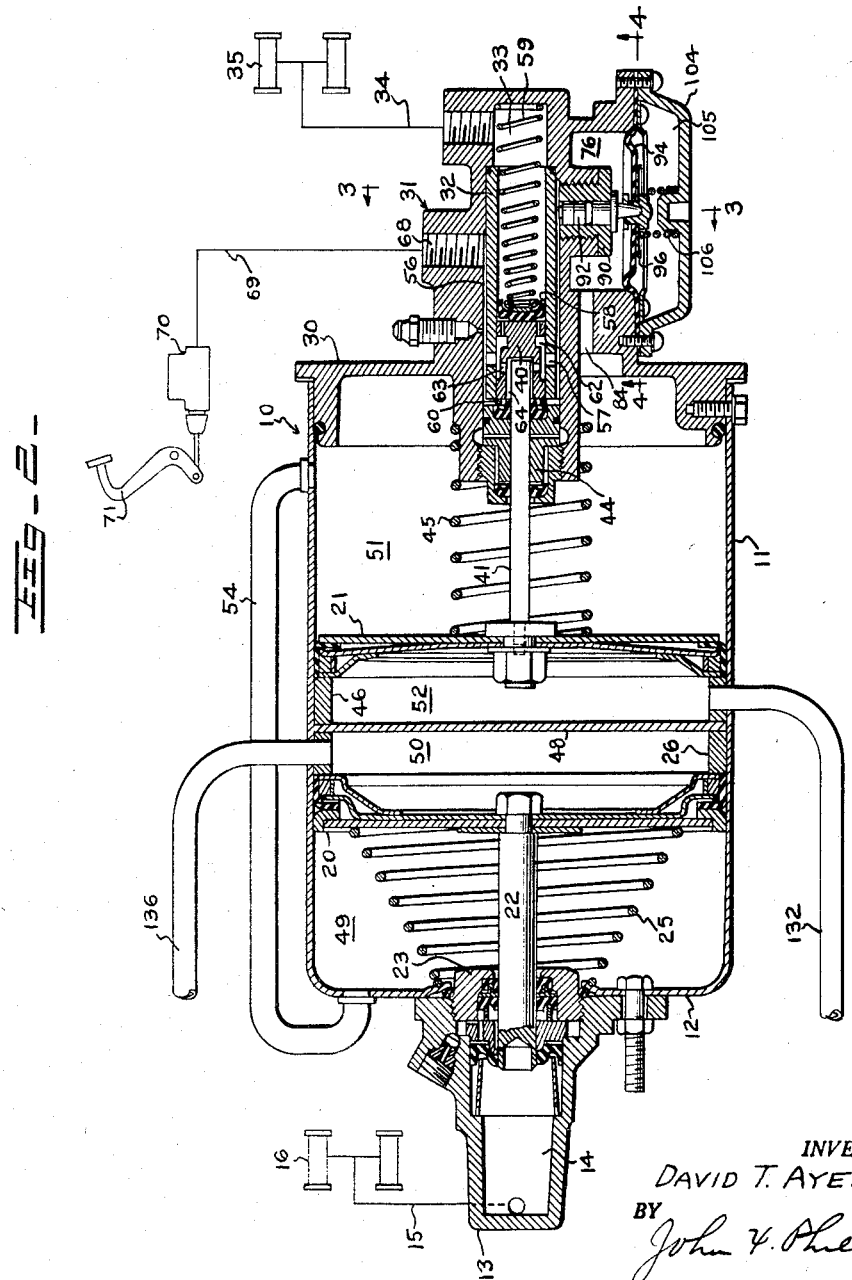

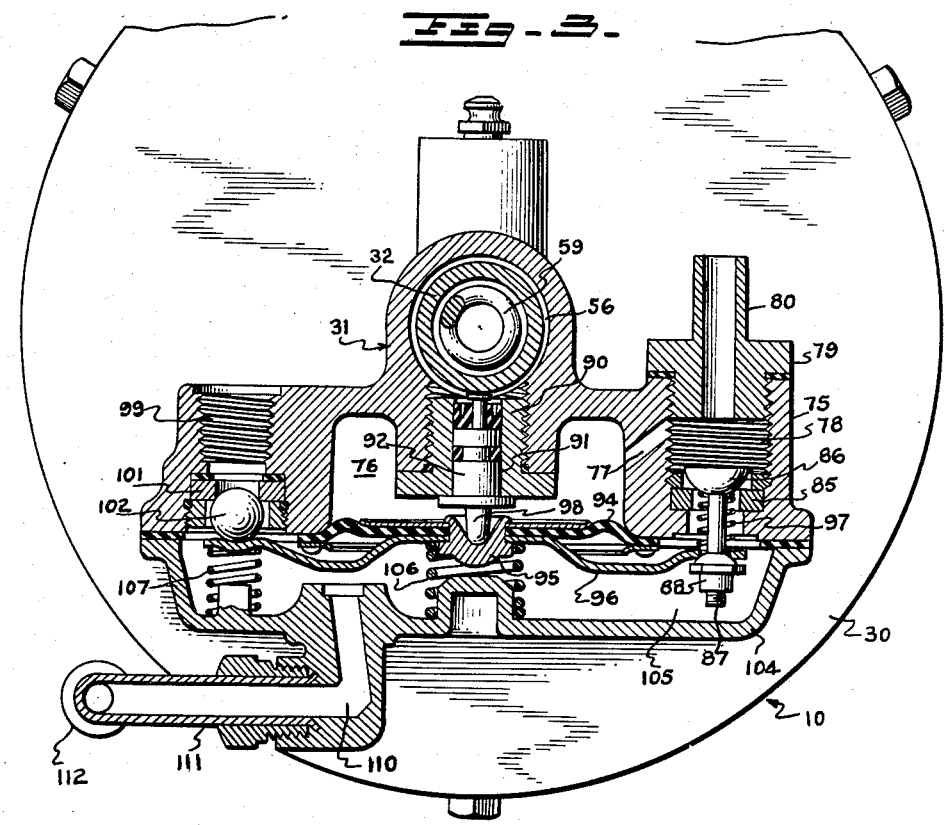
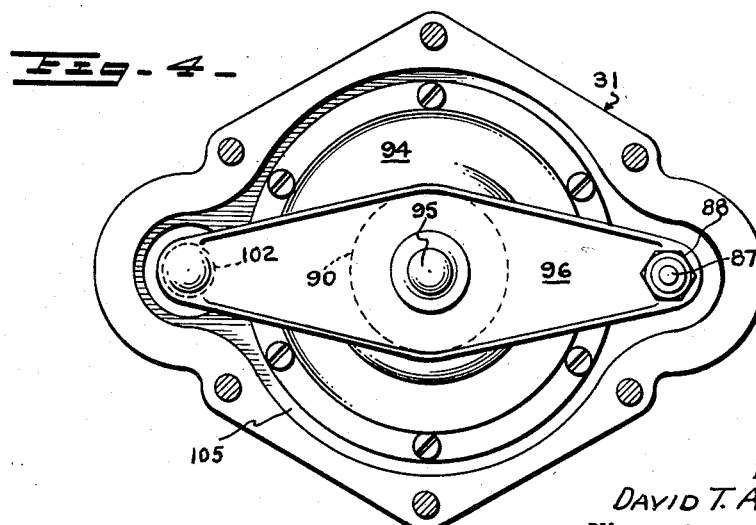

United States Patent Office 2,925,890
Patented Feb. 23, 1960

2,925,890

BOOSTER BRAKE MECHANISM

David T. Ayers, Jr., Birmingham, Mich., assignor to Kelsey-Hayes Company, a corporation of Delaware Application March 9, 1956, Serial No. 570,497

3 Claims. (Cl. 188—152)

This invention relates to a booster brake mechanism, and more particularly to a booster system especially adapted for such vehicles as pick-up trucks.

There is a very substantial variation in truck rear axle weights, depending upon the loading of the truck. Brake mechanisms for such trucks must provide for a substantial degree of rear axle braking when the truck is heavily loaded, and such brake action is excessive when the truck is traveling light. As a result, brake systems for such vehicles can involve a substantial element of danger when the brakes are applied when the vehicle is traveling light since the excessive braking of the rear wheels locks such wheels and causes them to slide on the road surface. Obviously, this is particularly dangerous on slippery roads.

It is also highly desirable in braking systems with relatively heavy brakes such as those of trucks to provide separate hydraulic pressure generating means for the wheel cylinders of the front and rear wheels so that a failure in one hydraulic line leading to one set of wheel cylinders will still provide for the braking of the other vehicle wheels, thus constituting a substantial factor of safety. Such a braking system is disclosed and claimed in the copending application of Edward Govan Hill, Serial No. 514,020, filed June 8, 1955, now patent No. 2,876,044, granted March 3, 1959.

An important object of the present invention is to provide a braking system particularly intended for trucks wherein braking forces at the rear wheels of the vehicle may be greatly proportionately reduced under manual control by the operator when the vehicle is traveling light, thus minimizing the danger of locking the rear vehicle wheels and the sliding of such wheels over a highway.

A further object is to provide such a system wherein a booster motor operates separately to generate hydraulic forces applied to the front and rear brake cylinders of the vehicle and wherein the application of hydraulic forces to the rear wheel cylinders is augmented by pedal generated forces applied by a conventional master cylinder, and to provide novel means for rendering the booster motor ineffective for generating brake applying forces at the rear wheels whereby such forces will be applied solely by pedal generated forces to eliminate the locking of the rear vehicle wheels.

A further object is to provide such a system employing a double-ended motor similar to the motor shown in the copending application referred to and to simultaneously energize both ends of the motor through the medium of a single valve mechanism controlled by a conventional master cylinder which assists one end of the motor in applying rear wheel braking forces, and to apply in such system a valve operable for energizing both ends of the motor if the brake pedal travels beyond its normal limit to thus apply the brakes, and also to use in conjunction with such a system a novel means for preventing energization of the end of the motor which generates forces in the rear vehicle wheels, thus permitting the rear wheel brakes to be solely pedal-operated to prevent over-application of the brakes when the vehicle is lightly loaded.

A further object is to provide such a system wherein the pedal operable means referred to and the means for rendering the rear booster motor inoperative are conneced in the same piping system, and wherein the two means referred to are independently operable.

Other objects and advantages will become apparent during the course of the following description.

In the drawings I have shown one embodiment of the invention. In this showing:

Figure 1 is a diagrammatic view of the system;

Figure 2 is an axial sectional view through the booster motor, parts being diagrammatically shown;

Figure 3 is an enlarged transverse sectional view on line 3—3 of Figure 2;

Figure 4 is a section of line 4—4 of Figure 2; and

Figure 5 is an enlarged detail sectional view through the pedal operated dump valve.

Referring to Figures 1 and 2, the numeral 10 designates a double-ended booster motor unit of the type shown in the copending application referred to above and which has been illustrated in Figures 2, 3 and 4 for a better understanding of the present invention. Referring to Figure 2, the motor comprises a cylinder 11 having a preferably integral head 12 at one end thereof carrying a housing 13 provided therein with the pressure chamber 14 communicating through suitable lines 15 with the wheel cylinders 16 of the front wheels 17, preferably the front wheels of a four-wheel truck.

The motor is shown in the present instance as being of the piston type, and there are two pistons 20 and 21 reciprocable in the cylinder 11. The piston 20 is connected to one end of a fluid displacing plunger 22 which projects through suitable bearing and sealing means 23 into the chamber 14 to displace fluid therefrom when the motor 10 is energized. A spring 25 biases the piston 20 to the normal off position shown in Figure 2, in engagement with a stop ring 26.

The other end of the motor is closed by a head 30 formed integral with a preferably die-cast body 31 in which is arranged a sleeve 32, the interior of the right-hand end of which together with the interior of the body 31 forms a hydraulic chamber 33 communicating through suitable lines 34 with the wheel cylinders 35 of the rear vehicle wheels 36.

The sleeve 32 forms a cylinder in which is operative a plunger 40 operable by a rod 41 connected to the piston 21 as shown in Figure 2. The body 31 carries suitable bearing and sealing means 44 through which the rod 41 projects. A return spring 45 biases the piston 21 to the off position shown in Figure 2, in engagement with a stop ring 46.

The cylinder 11 intermediate its ends and between the stop rings 26 and 46 is provided with an imperforate wall 48 which divides the motor to form two motor units, as will become apparent. The piston 21 divides the left-hand or front end of the motor in Figure 2 to form a vacuum chamber 49 and a variable pressure chamber 50. The piston 21 divides the right-hand or rear motor unit to form a vacuum chamber 51 and a variable pressure chamber 52. The two vacuum chambers 49 and 51 are connected by a jumper line 54. In a manner to be described, vacuum is always maintained in the motor chamber 51, hence vacuum is always present in the chamber 49 by virtue of the use of the jumper line 54.

Inwardly of the right-hand end of the sleeve 32 there is formed within the body 31 an annular chamber 56 communicating with the interior of the sleeve 32 through ports 57. To the right of these ports in Figure 2 the plunger 40 is provided with a lipped seal 58 engaged by a spring 59 to urge the plunger to an off position with its left-hand end in Figure 2 engaged with a wave ring 60.

It will be obvious that the seal 58 divides the hydraulic chamber 33 from a chamber 62 with which the ports 57 communicate. This chamber in turn communicates through ports 63 with an axial recess 64 formed in the left-hand end of the plunger 40 as shown in Figure 2. It will be apparent that fluid flowing from the annular chamber 56 through ports 57 and 63 is adapted to affect the entire rear or left-hand area of the plunger 40.

Fluid is supplied to the chamber 56 through a port 68 (Figure 2), and this port is connected by a line 69 (Figure 1) with a conventional master cylinder 70 operable by a conventional pedal 71. Obviously, when the pedal 71 is operated, fluid flows through line 69 and into the chamber 56 to apply a force rearwardly of the plunger 40 to assist the piston 21 in moving the plunger 40 to displace fluid from the chamber 33 into the rear brake cylinders 35.

Fluid thus supplied to the chamber 56 is also employed for operating a single valve mechanism for both booster motor units. Such valve mechanism is shown in detail in Figures 3 and 4 and forms per se no part of the present invention. The valve mechanism as illustrated is described and claimed in the copending application of Jeannot G. Ingres, Serial No. 455,647, filed September 13, 1954, now Patent No. 2,905,151, granted September 22, 1959.

Referring to Figure 3, the body 31 is provided with a depending annular skirt portion 75 having formed therein a chamber 76 communicating through a passage 77 with a vacuum port 78 in the upper end of which is threaded a fitting 79 provided with a nipple 80 connected by a vacuum line 81 (Figure 1) with a source of vacuum such as the engine intake manifold 82. The line 81 is preferably provided with the usual check valve 83. The chamber 76 is in fixed communication with the motor chamber 51 through a passage 84 (Figure 2).

In the bottom of the vacuum port 78 is arranged a valve seat 85 engageable by a hemispherical normally open vacuum valve 86 having a depending stem 87 on which is threaded a nut 88 for a purpose to be described.

Th body 31 is provided with a nut 90 threaded thereinto as shown in Figure 3 and forming a small cylinder 91 in which is arranged a plunger 92. The upper end of the cylinder 91 is open to the annular chamber 56 so that the plunger 92 will be moved downwardly by master cylinder fluid displaced into the chamber 56 as described above.

The chamber 76 is closed at the bottom thereof by a flexible diaphragm 94 secured by a thimble 95 to a valve operating lever 96. The right-hand end of this lever as viewed in Figure 3 is apertured to surround the stem 87, and a spring 97 is interposed between the vacuum valve 86 and the adjacent end of the lever 96 to urge the valve 86 upwardly relative to the lever 96. The thimble 95 receives in a top recess therein a depending stem 98 carried by and projecting downwardly from the plunger 92.

Diametrically opposite the vacuum port 78, the body 31 is provided with an air port 99 open to the atmosphere, preferably through an air cleaner 100 (Figure 1). In the air port 99 is arranged a valve seat 101 normally engaged by an air valve 102. This valve is engaged by the left-hand end of the lever 96 as viewed in Figure 3.

A cap 104 is secured against the bottom of the body 31 and this cap forms with the diaphragm 94 a chamber 105 connectible to the source of vacuum or to the atmosphere depending upon the positions of the valves 86 and 102. A spring 106 is arranged between the cap 104 and the lever 96 centrally of the length thereof to bias such portion of the lever upwardly together with the plunger 92. A lighter spring 107 is arranged between the cap 104 and the left-hand end of the lever 96 in Figure 3 to bias the air valve 102 to closed position.

The cap 104 is provided with a passage 110 communicating through an elbow 111 with a control line 112. Pressures in the line 112 are utilized in a manner to be described for controlling the motor 10.

Referring to Figures 1 and 5, the numeral 115 designates a dump valve as a whole comprising a valve housing 116 shown in detail in Figure 5. This housing is provided therein with an air chamber 117 communicating with the atmosphere, preferably through an air cleaner 118. The housing 116 is further provided with a control chamber 120 into which the line 112 is tapped. A valve seat 119 controls communication between the chambers 117 and 120 and is normally closed by a valve 121 having an operating stem 122. This stem is arranged beneath and in alinement with the brake pedal 71 but is normally beyond the path of travel of the pedal, and it will be apparent, therefore, that normal brake operations can be carried out without operating the stem 122. Thus the valve 121 is normally closed and is biased to closed position by a spring 123.

A pipe 125 is tapped into the chamber 120 and is connected through the run of a T 126 with a line 127 leading to a three-way valve 128. This valve has a manually operable valve element 129 controlled by a suitable handle (not shown) in the cab of the vehicle. A passage 130 in the valve 129 normally connects the line 127, as shown in Figure 1, to one end of a branch line 132 tapped into the variable pressure motor chamber 52 (Figure 2) through the stop ring 46. The three-way valve has a third connection leading to one end of a pipe 133 the other end of which is connected by a T 134 with the vacuum line 81. It will be apparent that pressure in the motor chamber 52 is controlled in accordance with pressure in the line 127 when the valve 129 is in the normal position shown in Figure 1. When the valve 129 is turned 90° from the position shown in Figure 1, the line 132 and accordingly the motor chamber 52 will be connected to the source of vacuum through pipes 133 and 81.

The branch of the T 126 is connected to one end of a line 136 the other end of which (Figure 2) is tapped into the variable pressure motor chamber 50 through the stop ring 26.

*Operation*

The various parts of the system normally occupy the positions shown in Figures 1, 2, 3 and 5. When the brakes are to be applied, the operator depresses the brake pedal 71, thus displacing fluid through the line 69 into the chamber 56, thence through port 57 behind the plunger 50. This fluid initially may flow through the openings in the plunger 40 adjacent the seal 58 to flow into the chamber 33 and thence into the rear brake cylinders 35 to take up play between the brake shoes and drums. This particular feature forms no part of the present invention.

Fluid in the chamber 56 acts on the upper end of the plunger 92 (Figure 3) to move this plunger downwardly together with the central portion of the lever 96. This movement takes place against the compression of the spring 106. Since the spring 107 biases the left-hand end of the lever 96 in Figure 3 to its normal position, downward force applied by the plunger 92 to the lever 96 will move the valve 86 to closed position. This cuts off the chamber 105 from the source of vacuum. The closing of the valve 86 also limits downward movement of the adjacent end of the lever 96, and further force applied to the center of this lever causes the left-hand end of the lever 96 in Figure 3 to move downwardly to release the air valve 102 so that air flows into the chamber 105 and thence into the line 112.

Assuming that the valve 121 (Figure 5) is closed, and the valve 129 is in its normal position as stated, air admitted into line 112 will flow into chamber 120, thence through lines 125, 127, 132 and 136 into the motor chambers 50 and 52. The admission of air into such motor chambers effects the operation of both pistons 20 and 21. Operation of the piston 20 causes its plunger 22 to move into the chamber 14 to displace fluid through lines 15 into the front wheel cylinders 16 to apply the front wheel brakes. It will be apparent that the application of the front wheel brakes is dependent solely upon pressures generated by the motor piston 20.

Operation of the piston 21 by air admitted into the chamber 52 engages the rod 41 with the plunger 40 to move the latter toward the right in Figure 2 to displace fluid through lines 34 to the rear wheel cylinders 35. Pedal generated pressures from the master cylinder 70 will act behind the plunger 40 to assist the piston 21 in generating hydraulic pressures in the chamber 33 for applying the rear wheel brakes. Therefore, it will be apparent that rear wheel braking forces will be the sum of the pressure in the chamber 33 generated by the piston 21 plus foot generated pressures, and accordingly the total rear wheel braking pressures will be limited solely by the operator's ability to generate hydraulic pressures through the operation of the brake pedal 71. It also will be apparent that in accordance with the disclosure of the copending application Serial No. 455,647 referred to above, a follow-up valve action is provided so that any intermediate braking forces can be applied in accordance with the operation of the pedal 71.

The brakes are released by releasing the pedal 71 whereupon the drop in pressure in the chamber 56 (Figure 3) permits the springs 106 and 107 to return the vacuum valve 86 to open position and the air valve 102 to closed position. Vacuum conditions then will be re-established in the chamber 105, and air will be evacuated from both motor chambers 50 and 52, thus vacuum-suspending the pistons 20 and 21. The pistons will be returned to normal position by their respective springs 25 and 45, and the plunger 40 will be returned to normal position by its spring 59.

As previously stated, the present system is particularly intended for use on four-wheel trucks, although it will be apparent that the numerals 35 and 36 may designate respectively the wheel cylinders and rear wheels of a six-wheel truck. It particularly has been found highly advantageous to use the present system on four-wheel trucks, and particularly such trucks of the light delivery type. The reason for this is that there is a tremendous proportionate spread in rear axle loads between an unloaded truck and one which is loaded to capacity. The present apparatus is highly desirable in that rear wheel braking forces may reach a very high point due to the fact that the braking forces are the sum of the forces delivered by the piston 21 and by the brake pedal 71. Thus, in accordance with the design of the booster motor any maximum rear braking forces may be generated. Such forces, however, are excessive when the vehicle is running lightly loaded and more particularly when the truck is carrying no load. Under such conditions it is desirable to provide a motor of such capacity as to generate the necessary hydraulic pressures in the front wheel cylinders in view of the relatively heavy engine weight carried by such wheels. At the same time, as maximum front wheel braking forces are generated, the excessive rear wheel braking forces will result in the locking of the brake of the rear wheels, thus causing such wheels to slide. Braking forces are thus lost at the rear wheels, the only decelerating action being provided by the friction between the rear wheels and the highway. This results in excessive wearing of the tires and provides a source of danger in that when the rear wheels lock, the driver will almost instinctively release pressure on the brake pedal, thus reducing front wheel braking pressures. The locking of the rear wheels is particularly dangerous when the vehicle is traveling on a slippery road.

The disadvantage referred to above is eliminated with the present system. When the vehicle is running light or carrying only a light load, the operator will turn the valve 129 (Figure 1) 90° clockwise from the position shown, thus connecting the pipes 132 and 133 the latter of which is always subject to vacuum in the source. This operation connects the motor chamber 52 to the source and thus maintains vacuum balanced on opposite sides of the piston 21, vacuum being constantly maintained under all conditions in the chamber 51. This operation does not limit energization of the front motor, and accordingly this motor may be energized to its maximum extent to apply braking pressures at the front wheels of the vehicle. Braking pressures in the rear wheel cylinders 35 will be pedal-applied pressures, and it will be noted that since the rod 41 is not positively connected to the plunger 40, the latter will be moved by pedal pressures to generate in the chamber 33 pressures corresponding to pressures in the master cylinder 70. Thus there is provided for the rear wheel cylinders 35 a manually operated brake mechanism and the operator is not called upon to move the piston 21 against the friction of such piston with the cylinder 11 and is not called upon to compress the spring 45.

The pedal applied pressures at the rear wheel cylinders 35 obviously will be proportional to pressures developed in the master cylinder 70. It further will be apparent that due to the action of the valve mechanism, pressures generated in the variable pressure chamber 50 will be proportional to pedal generated pressures since such pressures are depended upon to operate the valve mechanism. Thus with the rear booster motor unit de-energized, lower braking forces are provided for the rear wheel cylinders 16, but such forces are always proportionate to forces generated in the front wheel cylinders 16 up to the point of "power run-out" or maximum energization of the front wheel motor. Beyond this point, the operator may further depress the brake pedal to generate additional rear wheel braking forces.

It will be noted that the motor chamber 52 has its pressures controlled through line 132 and that the pressure in such line is dependent upon the position of the valve 129. Assuming that the valve 129 is in its normal position shown in Figure 1 and a break should occur in the line 69, brake pedal forces cannot be utilized in applying the rear wheel brakes and the pedal 71 will move beyond its normal limit of movement. If this occurs, the valve mechanism cannot control either motor unit. Under such conditions the pedal will move to the dotted line position shown in Figure 1 and will depress the stem 122 to open the valve 121. This operation dumps air into the line 125, and such air will flow into the motor chambers 50 and 52 to operate both motor units and apply the brakes. The valve 115 thus forms an emergency stopping means.

The operation of the valve 121 will also occur if the line 34 leading to the rear wheel cylinders 35 is ruptured. Under such conditions, fluid displaced from the master cylinder 70 cannot generate the pressure necessary to operate the valve mechanism, the plunger 40 moving freely to the right in Figure 2. While braking forces at the rear wheels under such conditions will be lost, movement of the pedal 71 beyond its normal path will open the valve 121 in the manner stated above and the dumping of air into the motor chamber 50 (Figure 1) will apply the front wheel brakes 16 thus at least affording an emergency operation of the front wheel brakes.

From the foregoing, it will be apparent that the dump valve 115 is connected between the valve mechanism and both motor units and that it therefore controls pressure in both motor chambers 50 and 52 in the same manner as if the valve 115 were not used when the system is operating under normal conditions. It also will be apparent that the three-way valve 128 is connected in the piping used with the valve 115 to prevent air flowing through the latter from raising pressure in the chamber 52 when it is desirable to depend solely upon foot generated pressures for operating the rear wheel cylinders 35. The system particularly forms an excellent means through which heavy braking pressures may be generated in the rear wheel cylinders of a truck when the latter is heavily loaded, and for limiting the generation of pressures in the rear wheel cylinders when the truck is running light. Under either condition, the generation of forces in the rear wheel cylinders is always substantially proportional to pressures generated in the front wheel cylinders. In other words, while pressures in the rear wheel cylinders under normal conditions are heavier than pressures in the front wheel cylinders, and are lighter in the rear wheel cylinders than in the front wheel cylinders when the motor chamber 52 is connected to the vacuum source by operation of the three-way valve 128, front and rear braking pressures nevertheless remain proportionate.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A brake system for a vehicle having front and rear wheel cylinders, comprising a first and a second fluid pressure motor unit each having a pressure responsive unit therein, a first and a second hydraulic chamber connected respectively to said front and rear wheel cylinders, a first plunger movable in said first chamber and connected to the pressure responsive unit of said first motor unit, a second plunger movable into said second hydraulic chamber and connected to the pressure responsive unit of said second motor unit, each motor unit having a constant pressure chamber and a variable pressure chamber the former of which is in fixed communication with a source of relatively low pressure, a single follow-up control valve mechanism having fluid connection with said variable pressure chambers and with said source of low pressure and with a source of higher pressure and normally connecting said variable pressure chambers to said source of low pressure, said second plunger having one end open to said second hydraulic chamber and having a space at its other end, common means for operating said valve mechanism to connect said variable pressure chambers to said source of higher pressure and for supplying hydraulic fluid to said space to assist said second motor unit in operating said second plunger, and a manually operable valve operable independently of said control valve mechanism and arranged between said control valve mechanism and the variable pressure chamber of said second motor unit for connecting the latter chamber with said source of lower pressure and disconnecting it from said control valve mechanism to render said second motor unit inoperative, whereby said first motor unit will be activated by operation of said valve mechanism by said common means and the latter will supply hydraulic fluid to said space at a pressure proportional to pressure supplied to the variable pressure chamber of said first motor unit by said valve mechanism.

2. A brake system according to claim 1 provided with a cylinder having a plunger therein connected to said valve mechanism to operate it, said common means comprising a pedal operable master cylinder connected to said last-named cylinder and to said space whereby fluid displaced from said motor cylinder moves said last-named plunger to operate said control valve mechanism and applies pedal generated hydraulic pressure to said second plunger.

3. A brake system for a motor vehicle having front and rear wheel cylinders, comprising a first and a second hydraulic chamber connected respectively to said front and rear wheel cylinders, first and second fluid motor units respectively having a first and second pressure responsive unit therein dividing it to form a constant pressure chamber and a variable pressure chamber, a first and a second plunger connected respectively to said first and second pressure responsive units and movable thereby respectively into said first and second hydraulic chambers, means connecting said constant pressure chambers to a source of relatively low pressure, a single follow-up control valve mechanism having fluid connection with said source of low pressure and with a source of higher pressure, a conduit connected to said valve mechanism and having a branch connected to each of said variable pressure chambers, said valve mechanism normally connecting said conduit to said source of low pressure and being operable for connecting it to said source of higher pressure to supply fluid from the latter source to said variable pressure chambers, hydraulically operable means connected to said valve mechanism to operate it, a pedal, a master cylinder connected to said pedal and having fluid connection with said hydraulically operable means to operate said valve mechanism, said second plunger having one end open to said second hydraulic chamber and having a space at its other end, said space having fluid connection with said master cylinder for the application to said second plunger of pedal generated pressures, and manually operable means in the branch leading to said second variable pressure chamber for disconnecting the latter from said conduit and connecting it to said source of low pressure, whereby operation of said master cylinder operates said valve mechanism to supply higher pressure to the variable pressure chamber of said first motor unit and supplies to said space hydraulic pressure proportionate to the pressure supplied to said last-mentioned variable pressure chamber.

References Cited in the file of this patent

UNITED STATES PATENTS

| 2,242,297 | Freeman | May 20, 1941 |
| 2,353,755 | Price | July 18, 1944 |
| 2,373,272 | Stelzer | Apr. 10, 1945 |
| 2,402,344 | Price | June 18, 1946 |
| 2,429,195 | Price | Oct. 14, 1947 |
| 2,747,697 | Banker | May 29, 1956 |

FOREIGN PATENTS

| 16,432 | France | May 18, 1954 |